Oct. 15, 1968     E. C. BENBOW     3,406,338
MAXIMUM-DEMAND DEVICE WITH CLUTCH HAVING ADJUSTABLE OPEN TIME
Filed Sept. 14, 1965     2 Sheets-Sheet 1

Oct. 15, 1968  E. C. BENBOW  3,406,338
MAXIMUM-DEMAND DEVICE WITH CLUTCH HAVING ADJUSTABLE OPEN TIME
Filed Sept. 14, 1965  2 Sheets-Sheet 2

United States Patent Office 3,406,338
Patented Oct. 15, 1968

3,406,338
MAXIMUM-DEMAND DEVICE WITH CLUTCH HAVING ADJUSTABLE OPEN TIME
Eugene C. Benbow, Raleigh, N.C., assignor to Westinghouse Electric Corporation, Pittsburgh, Pa., a corporation of Pennsylvania
Filed Sept. 14, 1965, Ser. No. 487,170
5 Claims. (Cl. 324—103)

ABSTRACT OF THE DISCLOSURE

A maximum demand device drives a maximum demand indicator through a clutch. The clutch is released at the end of each demand interval for resetting purposes. The clutch release is operated from an operator which moves at a varying rate through each of a plurality of repetitive similar cycles. The operator is coupled to the clutch for release purpose during a small part of each cycle. The position of this small part in the cycle is adjustable to adjust the clutch-open time.

---

This invention relates to a device employing a clutch mechanism and it has particular relation to a maximum-demand device wherein the release of clutch mechanism is time controlled.

Although aspects of the invention may be incorporated in mechanisms of many different types employing clutches the invention is particularly suitable for maximum-devices and will be described as applied to such a device.

In a maximum-demand device an indicator is coupled through a releasable clutch to a measuring unit designed to measure a variable quantity. At the end of each demand interval the clutch is disengaged or opened to permit resetting of the indicator. However excessive open time should be avoided for the reason that the variable quantity is not being measured by the indicator during such open time.

It has been the practice to adjust the open time of a clutch mechanism by adjusting the separation of the clutch surfaces. Inasmuch as the clutch surfaces are biased towards engagement by a spring, such an adjustment varies the compression of the spring and thus varies the load presented to the clutch operator.

In accordance with the invention the clutch operator includes a member or rotor which moves or rotates in repetitive, similar cycles, each corresponding to one demand interval. During each cycle the member moves at a variable rather than a uniform rate. The clutch is open during movement of the member through only a small portion of each cycle. Adjustment of the open time is effected by varying the position of the portion relative to the cycle.

It is therefore an object of the invention to provide an improved device having clutch mechanism wherein the clutch mechanism has an adjustable open time.

It is also an object of the invention to provide an improved method for adjusting the operation of a measuring mechanism.

Other objects of the invention will be apparent from the following description taken in conjunction with the accompanying drawings, in which.

Figure 1:
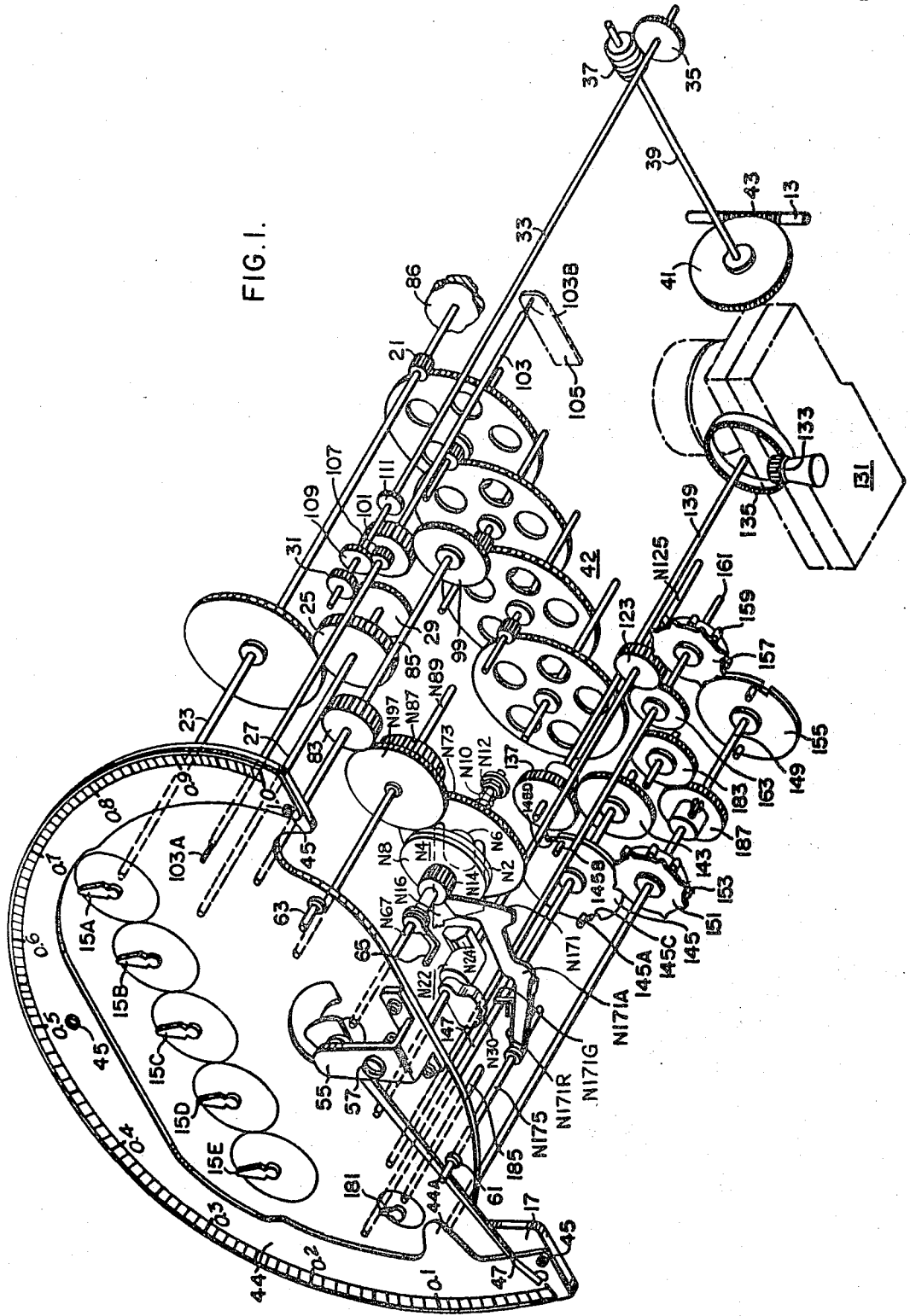
FIGURE 1 is a view in perspective, with parts broken away of a maximum-demand device embodying the invention.

In order to simplify the presentation of the invention the measuring device of FIG. 1 employs components shown in FIG. 1 of my Patent No. 3,136,947 which issued June 9, 1964. Each component of my patent which is here reproduced bears the same reference character employed for the component in the patent. Each new component is identified by a reference character preceded by the letter N.

As explained in my aforesaid patent the gear 83 is coupled for rotation in accordance with rotation of the shaft 13 of a conventional induction-disk-type watthour meter. The gear 83 is releasably coupled to a pusher member 65 by mechanism which now will be discussed.

The gear 83 is coupled to a gear N73 through two gears N87 and N97 which correspond to the gears 87 and 89 of my aforesaid patent. However, in the present case these two gears N87 and N97 are pressed on, and rotate with, a shaft N89 which corresponds to a shaft N89 of my patent. They constitute a transfer gear unit for transmitting rotation from the gear 83 to the gear N73.

The gear N73 and the driving plate N2 of a clutch N4 are secured to a sleeve N6 which in turn is mounted for rotation relative to a shaft N67. The driven plate N8 of the clutch N4, a pinion N14 and the pusher member 65 are secured to a sleeve N14A which is concentrically mounted on, and free to rotate relative to, the shaft N67. Suitable stops restrict axial movement of the sleeve N14A relative to the shaft N67. The adjacent surfaces of the clutch plates N2 and N8 are biased into engagement by means of a helical spring mounted on the shaft N67 and compressed between the gear N73 and a nut N12 which is in threaded engagement with the shaft. A lock nut N12L may be employed for assuring maintenance of the nut N12 in adjusted position.

Figure 2:
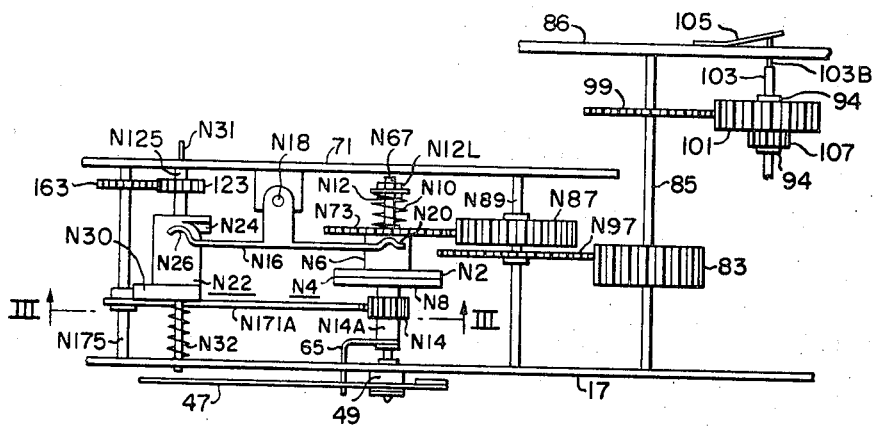
FIG. 2 is a view in top plan of a portion of the device shown in FIG. 1.

The clutch is opened or disengaged by operation of a trip lever or arm N16 which is mounted for pivotal movement about a pin N18. The right-hand end of the lever N16 as viewed in FIG. 2 has a forked configuration which straddles the sleeve N6. Each tine of the resultant fork may have a similar spherical bump N20 formed therein to establish point contact between the bump and the gear N73. This minimizes friction between the parts.

For opening the clutch N4 at the end of each demand interval a gear 123 is provided. This gear is secured to a shaft N125 which corresponds to the shaft 125 of my aforesaid patent and the gear meshes with a gear 163. As clearly described in my aforesaid patent the gear 123 is coupled to the synchronous motor 131 and makes one revolution for each demand interval. Thus for a demand interval of fifteen minutes the gear 123 is rotated at a rate of four revolutions per hour.

Because of the presence of Geneva gearing between the gear 123 and the synchronous motor 131 the rotation of the gear 123 is not continuous. The gear 123 is rotated in successive steps or impulses each of the steps being effective for rotating the gear 123 through an angle of 180°. The action of the Geneva gearing is such that the motion of the gear 123 is not uniform through each of these steps.

Rotation of the gear 123 acts to open the clutch N4 at intervals through a cam unit N22 which is secured to the shaft N125. This cam unit has a first cam N24 which cooperates with a cam follower N26 formed on the left-hand end of the lever N16 as viewed in FIG. 2. As representative of suitable parameters the clutch N4 may be held open for a time of the order of 2 to 4 seconds by operation of th first cam N24 during 30° of rotation of the shaft N125. For other positions of the shaft 125 the clutch N4 is in an engaged or closed condition.

The resetting of the pusher member 65 is effected through a sector gear N171 which is in permanent mesh with the pinion N14. The sector gear N171 is located at the end of an arm N171A which in turn is mounted for rotation about a shaft N175. A spring N171R provides a cam follower N171G thr ugh which the arm is operated. The construction of the components N171, N171A, N171R and N171G is similar to that of the components 171, 171A, 171R and 171G of my aforesaid patent.

Figure 3:
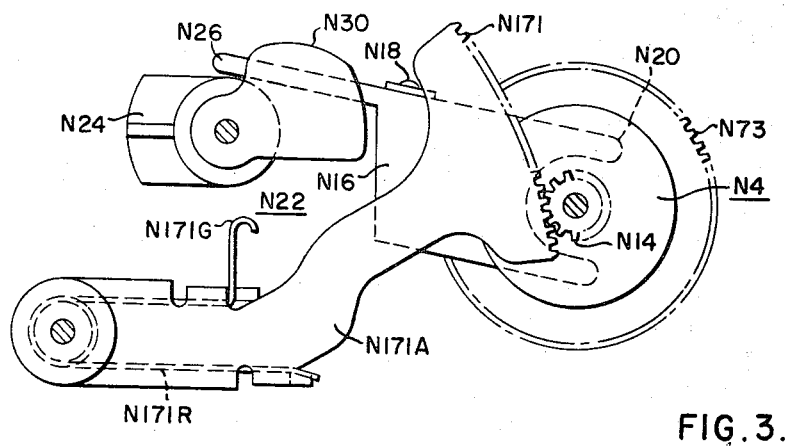
FIG. 3 is a view taken on the line III—III of FIG. 2.

During a demand interval, rotation of the pinion N14 rotates the arm N171A in a counterclockwise direction as viewed in FIGURE 3. At the end of the demand interval the clutch N4 is opened and the arm N171A is actuated in clockwise direction for the purpose of resetting the pusher arm or member 65. The resetting movement of the arm N171A is effected through a second cam N30 provided on the cam unit N22.

The cam unit may be formed from a suitable metal but excellent results have been obtained from a plastic cam unit N22 constructed of a material such as "nylon" or "Teflon," trade names respectively for a super polyamide material and a polytetrafluoroethylene material. These materials are readily molded to the desired shape on the shaft N125 and have low-friction properties.

In order to adjust the open time of the clutch N4 the angular position of the gear 123 relative to its meshing gear 163 is made adjustable. In the specific embodiment herein illustrated the shaft N125 has a portion N31 of reduced diameter which forms a pivot protruding through a bearing hole in the plate 71. The shaft N125 is biased towards the plate 71 by means of a helical spring N32 which surrounds the shaft and is located between the cam unit N22 and the plate 17. Thus, to change the angular position of the shaft N125 the shaft is urged downwardly, as viewed in FIG. 2, against the bias of the spring N32 until the gears 123 and 163 are demeshed. The shaft N125 next may be rotated to a new angular position and the gears then may be restored to mesh.

In considering the operation of the invention let it be assumed that a demand interval of fifteen minutes has just started. Under these conditions the pusher member 65 is reset to its zero position and the clutch N4 is in an engaged condition. Rotation of the watthour meter shaft 13 moves the pusher member 65 up-scale at a rate dependent upon the rate of the shaft 13. At the same time the pinion N14 moves the arm N171A in a counterclockwise direction as viewed in FIGURE 3.

At the end of approximately 7½ minutes the synchronous motor 131 acts through the Geneva gearing to rotate the shaft N125 approximately 180°. Such rotation requires say 25 seconds and has no effect on other components of the device.

During the terminal portion of another period of approximately 7½ minutes the synchronous motor 131 again acts through the Geneva gearing to rotate the shaft N125 through an angle of 180°. During this rotation, which again may require about 25 seconds, the first cam N24 engages the cam follower N26 to open the clutch N4. The clutch remains open during approximately 30° of rotation of the shaft N125 for the purpose of decoupling the pusher member 65 from the gear N73.

Immediately after the clutch N4 opens, the second cam N30 engages the cam follower N171G to urge the arm N171 in a clockwise direction as viewed in FIGURE 3. The arm acts through the sector gear N171 and the pinion N14 to reset the pusher member 65 to its zero position and the clutch thereafter reengages or closes.

It should be noted that the clutch N4 remains open for only 30° of the second 180° movement or rotation of the shaft N125. Inasmuch as the rate of rotation of the shaft N125 over this angular distance of 180° is not uniform it follows that the time length of the period during which the clutch N4 remains open depends on the part of the 180° movement of the shaft N125 during which the first cam N24 is in engagement with the cam follower N26. If the length of this time period is to be adjusted the shaft N125 is moved downwardly against the bias of the spring N32 until the gears 123 and 163 are demeshed. The shaft N125 then is rotated for the purpose of selecting another 30° portion of the aforesaid 180° angular movement of the shaft N125 during which the first cam N24 is in engagement with the cam follower N26. Following such adjustment the gears 123 and 163 are returned into mesh with each other.

It should be noted that this adjustment does not alter the compression of the spring N10 and does not affect the loading of the synchronous motor 131.

I claim as my invention:

1. In a maximum-demand measuring device, a measuring unit for measuring a variable quantity, an indicating member for indicating a function of the variable quantity, coupling means for coupling the indicating member for operation by the measuring unit and for decoupling the indicating member from the measuring unit, and timing means for timing the operation of the coupling means, said timing means comprising a timing element having a timing condition which varies irregularly during each of a plurality of successive similar timing cycles, and operating means responsive to said condition during part only of each of said cycles for operating the coupling means to decouple the indicating member from the measuring unit during said part of each of said cycles and permit resetting of said indication member while decoupled, said timing means being adjustable for varying the position of each of said parts relative to the associated cycle to assure decoupling time for proper resetting.

2. A device as claimed in claim 1 wherein said timing means comprises a stator and a rotor, means for rotating the rotor relative to the stator through similar successive rotations, said rotor having a rate of rotation which varies during each of said rotations, and wherein said operating means comprises means operating the coupling means to decoupling condition during a predetermined angular movement of said rotor less than 360° for each of said rotations, said operating means being adjustable to vary the angular position of said predetermined angular movement for each of said rotations, whereby the duration of each decoupling of the indicating member from the measuring unit is adjustable.

3. A device as claimed in claim 1 wherein said timing means comprises a supporting structure and a cam, means for rotating the cam about an axis relative to the supporting structure in a plurality of similar successive rotations, said cam during each of said rotations having a rate of angular motion which varies, means including a cam follower positioned for operation by the cam for operating the coupling means to decoupled condition for the duration of the camming engagement of the cam and the cam follower, the angular displacement between said cam and said cam follower when the device is at rest being adjustable to vary the duration of each decoupling of the indicating member during operation of the device.

4. A device as claimed in claim 3 wherein said timing means includes a pair of meshing gears through which said cam is rotated about said axis, and means mounting said gears for relative motion to a demeshed condition wherein one of the gears is rotatable independently of the other of said gears to alter the deviation of each of said decouplings of the indicating member during operation of the device.

5. A device as claimed in claim 4 wherein said timing means comprises a synchronous motor and Geneva gear means coupling said motor to said cam through said meshing gears.

References Cited

UNITED STATES PATENTS

| | | | |
|---|---|---|---|
| 2,149,410 | 3/1939 | Weisman | 324—103 |
| 3,136,947 | 6/1964 | Benbow | 324—103 |

RUDOLPH V. ROLINEC, *Primary Examiner.*

E. F. KARLSEN, *Assistant Examiner.*